United States Patent [19]

Nemoto et al.

[11] Patent Number: 4,952,957
[45] Date of Patent: Aug. 28, 1990

[54] FOCAL PLANE SHUTTER-TYPE CAMERA

[75] Inventors: Ichiro Nemoto; Takahito Otora; Osamu Miyauchi, all of Yotsukaido, Japan

[73] Assignee: Seikosha Co., Ltd., Japan

[21] Appl. No.: 404,323

[22] Filed: Sep. 7, 1989

[30] Foreign Application Priority Data

Sep. 13, 1988 [JP] Japan ............................ 63-120246[U]

[51] Int. Cl.⁵ .............................................. G03B 9/40
[52] U.S. Cl. .................................. 354/245; 354/234.1; 354/246
[58] Field of Search ............... 354/245, 246, 247, 248, 354/249, 250, 251, 252, 253, 254, 234.1

[56] References Cited

U.S. PATENT DOCUMENTS

| 4,364,654 | 12/1982 | Senuma et al. | 354/246 X |
| 4,458,998 | 7/1984 | Tanaka et al. | 354/246 X |
| 4,487,492 | 12/1984 | Toyoda et al. | 354/234.1 |
| 4,671,637 | 6/1987 | Toyoda | 354/234.1 |
| 4,814,807 | 3/1989 | Nakagawa et al. | 354/246 |

Primary Examiner—A. A. Mathews
Attorney, Agent, or Firm—Bruce L. Adams; Van C. Wilks

[57] ABSTRACT

A focal plane shutter camera including a first chamber forming section having a baseplate with a shutter opening formed therein and which accommodates shutter blades and including a second chamber forming section which accommodates shutter controlling members. A lower plate structure member is assembled to a baseplate structure member and is provided with a lower plate for partitioning the first and second chambers.

2 Claims, 4 Drawing Sheets

FOCAL PLANE SHUTTER-TYPE CAMERA

BACKGROUND OF THE INVENTION

1. Field of the Invention

The present invention relates to a focal plane shutter-type camera, and more particularly to a focal plane shutter in which the assembling feature of a shutter portion thereof is improved.

2. Description of the Prior Art

With respect to a conventional focal plane shutter-type camera, when assembling a shutter portion thereof, the following procedure is taken, as disclosed in, for instance, the specification and drawings of Japanese Utility Model Application No. 138990/1986. After a shutter driving lever and shutter controlling members such as a shutter speed controlling electromagnet are assembled from the front surface of a shutter baseplate, an upper plate for covering them is secured by tightening with screws. Subsequently, with the shutter baseplate reversed, a shutter blade unit such as one having an opening sector and a closing sector is assembled from the rear surface of the baseplate, and then a blade receiving plate for covering them is secured by tightening with screws.

However, with such a conventional focal plane shutter type camera, when its shutter portion is assembled it is necessary to perform an assembly operation from both the front and rear surfaces of the shutter baseplate, so that there is a problem in that it is difficult to automate the assembling operation.

In addition, there has also been a problem in that since various members are fixed by tightening with screws, the quality of the overall assembly of the shutter becomes unstable.

SUMMARY OF THE INVENTION

Accordingly, in order to overcome the above-described problems, in accordance with the present invention there is provided a focal plane shutter-type camera comprising: a baseplate structure member in which a first chamber forming section having a baseplate with a shutter opening formed therein and adapted to accommodate shutter blades and a second chamber forming section for accommodating shutter controlling members are formed; and a lower plate structure member which is assembled to the baseplate structure member from the first chamber side and is provided with a lower plate for partitioning the first and second chambers.

In addition, an arrangement is provided such that the shutter controlling members and the lower plate structure member are resiliently assembled to and coupled with the baseplate structure member.

In accordance with the focal plane shutter-type camera thus constructed, when the lower structure member is assembled to the baseplate structure member, the shutter controlling members are accommodated in the second chamber of the baseplate structure member from the first chamber side, and then the lower structure member is assembled from the first chamber side, followed by the accommodation of the shutter blades in the first chamber. Thus, since the shutter controlling members and the shutter blades can be assembled to the baseplate structure member from the same first chamber side, the automation of the shutter assembling operation can be facilitated.

In addition, since the shutter controlling members and the lower plate structure member are resiliently assembled to and coupled with the baseplate structure member, it is possible to stabilize the quality of the shutter assembly without requiring torque control as is experienced in tightening with screws.

BRIEF DESCRIPTION OF THE DRAWINGS

FIG. 1 is a perspective view of a baseplate structure member after assembly, as viewed from the controlling outer wall portion side;

FIG. 2 is a perspective diagram of the baseplate structure member, as viewed from the blade receiving plate side;

FIG. 3 is an exploded perspective view illustrating the procedures of assembling various shutter controlling members and a lower structure member; and FIG. 4 is an exploded perspective view illustrating the procedure of assembling shutter blades.

DESCRIPTION OF THE PREFERRED EMBODIMENTS

Figure 1:
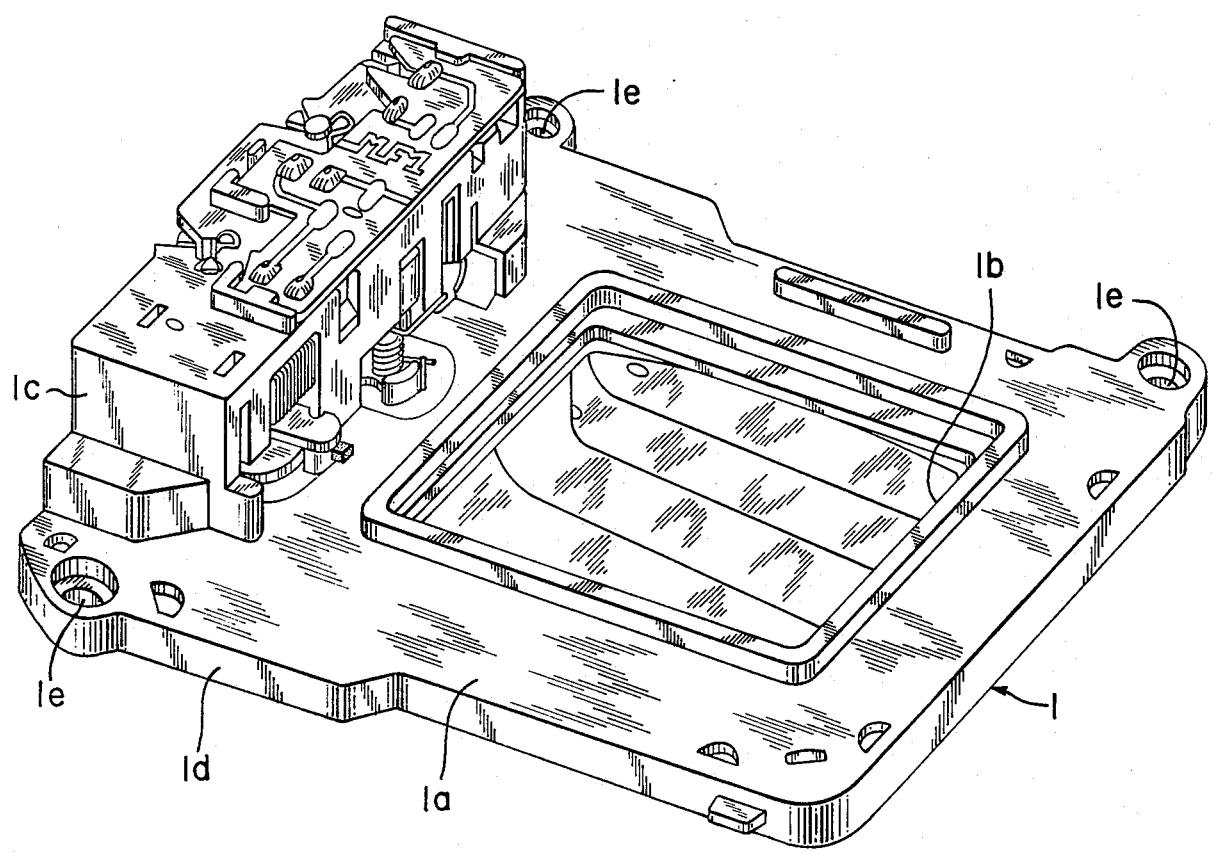
FIGS. 1 to 4 are diagrams illustrating an embodiment of a focal plane shutter-type camera in accordance with the present invention.

Referring now to the drawings, a description will be given of an embodiment of the present invention. FIGS. 1 to 4 are diagrams illustrating an embodiment of a focal plane shutter-type camera in accordance with the present invention.

In FIG. 1, reference numeral 1 denotes a baseplate structure member having a baseplate 1a, and a shutter opening 1b is formed in the baseplate 1a. A box-shaped controlling outer wall member 1c (a second chamber forming portion) is formed on a first surface (upper surface in the drawing) side of the baseplate structure member 1, and various members constituting shutter controlling members, such as an electromagnet, a lever and the like, which will described later, are accommodated in the second chamber in this controlling outer wall portion 1c.

Figure 2:
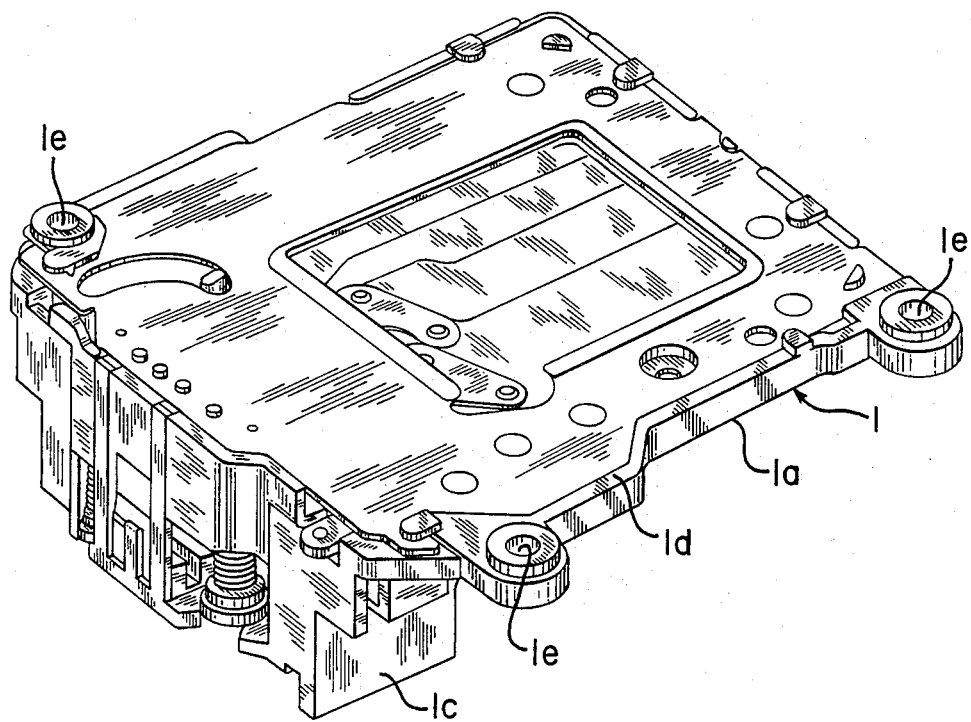

A sector outer wall portion 1d (first chamber forming portion) formed in such a manner as to rise toward the second surface side along a peripheral portion of the baseplate 1a is provided on a second surface (lower surface in the drawing) side of the baseplate structure member 1, as shown in FIG. 2, and various members such as a sector unit (which will be described later) constituting the shutter blades are accommodated in the first chamber surrounded by this sector outer wall portion 1d. The baseplate structure member 1 thus assembled is mounted to an unillustrated camera structure via mounting bores 1e.

Next, referring to FIGS. 3 and 4, a description will be given of the procedures of assembling the shutter controlling members and the shutter blades to the baseplate structure member 1 as well as their detailed structure.

Figure 3:
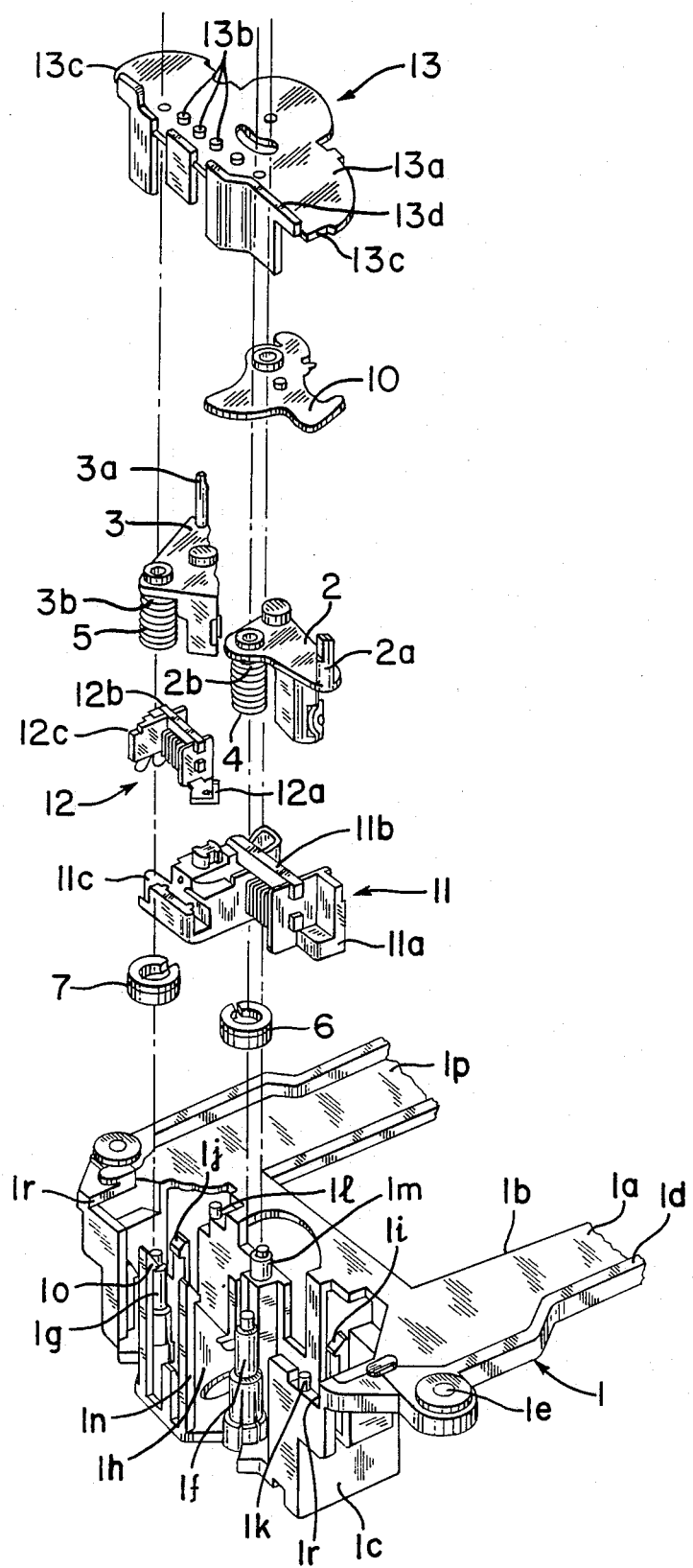

First, as shown in FIG. 3, the baseplate structure member 1 is disposed with the aforementioned second surface (on the sector outer wall portion 1d side) facing upward. Then, ratchets 6, 7 for adjusting an opening spring 4 and a closing spring 5 which will be described below are assembled to an opening lever shaft 1f and a closing lever shaft 1g of the baseplate structure member 1. Subsequently, an electromagnet 11 having a coil frame 11a, an iron core 11b, and an iron core spring 11c and adapted to hold an opening lever 2 which will be described later is assembled to a second chamber 1h in the controlling outer wall portion 1c from a first chamber 1p side, and is resiliently retained by a hook of an electromagnet retaining portion 1i so as to prevent it from coming off upwardly and downwardly. In a similar manner, an electromagnet having a coil frame 12a, an iron core 12b, and an iron core spring 12c and adapted to hold a closing lever 3 which will be described later is assembled to the second chamber 1h in the controlling outer wall portion 1c and is resiliently retained by a hook of an electromagnet retaining portion 1j.

Next, as shown in FIG. 3, unillustrated damper rubber serving as a stopper for the opening lever 2 and the closing lever 3 which will be described below is assembled to shafts 1k, 1l of the baseplate structure member 1. Then, after the opening spring 4 is assembled to a sleeve 2b of the opening lever 2 for effecting an opening operation of the shutter opening 1b by driving an opening sector unit 14, as shown in FIG. 4, the sleeve 2b of the opening lever 2 is fitted on an opening lever shaft 1f of the baseplate structure member 1 so as to be assembled. Similarly, after the closing spring 5 is assembled to a sleeve 3b of the closing lever 3 for effecting a closing operation of the shutter opening 1b by driving a closing sector unit 15 which will be described later, the sleeve 3b of the closing lever 3 is fitted on a closing lever shaft 1g of the baseplate structure member 1 so as to be assembled.

Next, after a set lever 10 for setting the opening lever 2 and the closing lever 3 on the initial position side is assembled to a set shaft 1m of the baseplate structure member 1, a lower structure member 13 having a lower plate 13a is assembled from a first chamber 1p side of in baseplate structure member 1 by being guided by the opening lever shaft 1f, the closing lever shaft 1g, the set shaft 1m, and the sliding contact between a guide surface 1r of the baseplate structure member 1 and a guide surface 13c of the lower structure member 13, and is assembled and coupled by being resiliently retained by hooks of lower plate retaining members 1n, 1o, so as to prevent the same from coming off. At this time, the lower plate 13a of the lower plate structure member 13 is disposed in such a manner as to partition the first chamber 1p in the sector outer wall portion 1d of the baseplate structure member 1 and the second chamber 1h in the controlling outer wall portion 1c, and itself has a sector outer wall portion 13d which corresponds to the sector outer wall portion 1d.

Figure 4:
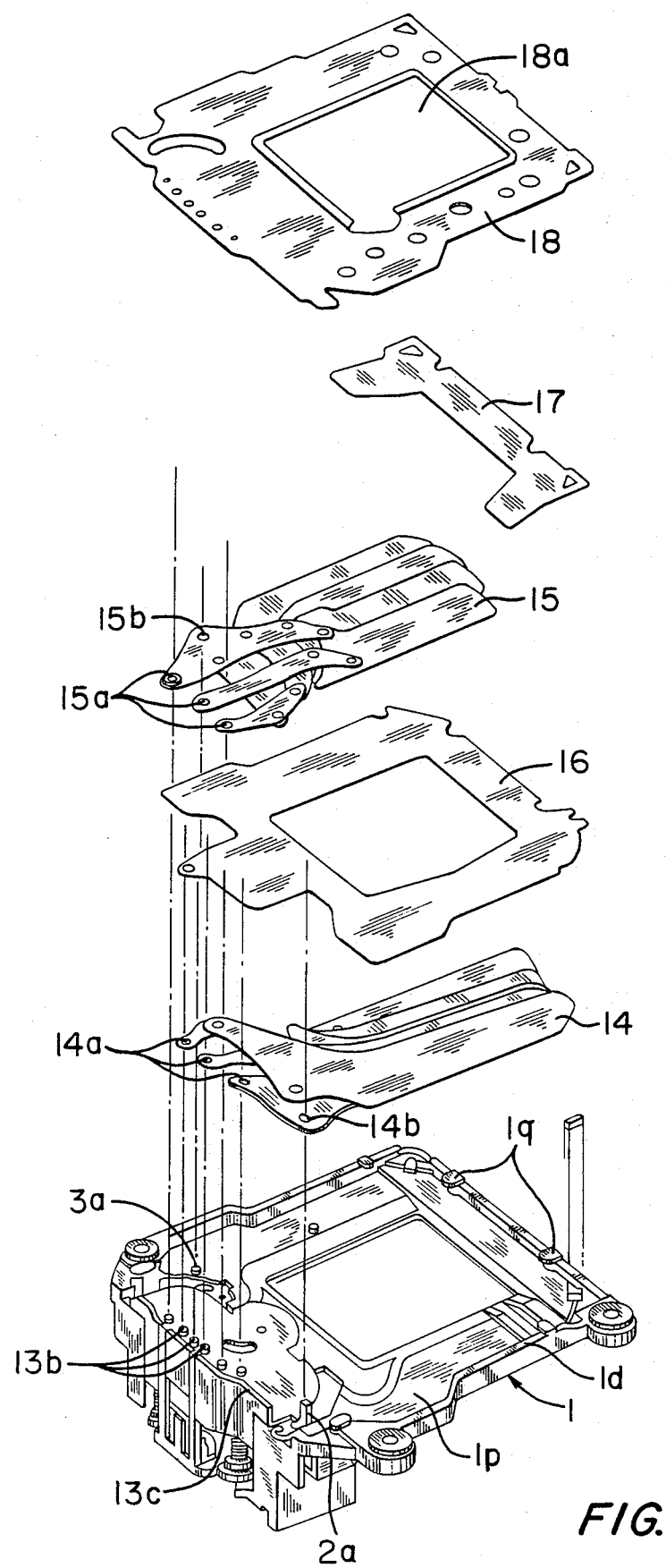

After the various shutter controlling members and the lower plate structure member 13 are assembled to the baseplate structure member 1 from the first chamber 1p side, the opening sector unit 14 comprising a plurality of shutter blades is accommodated in the first chamber 1p surrounded by the sector outer wall portion 1d, as shown in FIG. 4. At this time, fitting bores 14a of the opening sector unit 14 are fitted with sector guide shafts 13b of the lower plate structure member 13, while a fitting bore 14b of the opening sector unit 14 is fitted with a sector driving pin 2a of the opening lever 2 so as to be assembled. Then, the closing sector unit 15 constituted by a plurality of shutter blades is accommodated in such a manner as to clamp a spacer blade 16, and, at this time, the fitting bores 15a of the closing sector unit 15 are fitted with the sector guide shafts 13b of the lower plate structure member 13, while a fitting bore 15b of the closing sector unit 15 is fitted with a sector driving pin 3a of the closing lever 3 so as to be assembled. The spacer blade 16 is adapted to separate the shutter blades of the opening sector unit 14 and those of the closing sector unit 15 so that the shutter blades thereof will not collide against each other.

In addition, a blade receiving plate 18 for closing the first chamber 1p from the outside is attached to an outermost surface layer portion of the sector outer wall portion 1d by means of a receiving plate hook portion 1q in such a manner as to clamp a spacer blade 17 used for preventing leakage of light and serving as a sector guide for the closing sector unit 15, thereby completing the assembly. A shutter opening 18a is similarly formed in the blade receiving plate 18. Since the exposure operation using these focal plane shutter-type sector units is publicly known, a description thereof will be omitted.

It should be noted that although in the above-described embodiment various shafts such as the opening/closing lever shafts and sector guide shafts are arranged integrally with the lower plate structure member, the shafts may be fabricated from a metal or the like as a single unit and may be pressure fitted or fixed by means of caulking or the like.

As described above, in accordance with the present invention, since the shutter controlling members and the shutter blades can be assembled to the baseplate structure member from the same first chamber side, the automation of the assembling operation of the shutter section of a camera can be facilitated.

In addition, since the shutter controlling members and the lower structure member are resiliently assembled to and coupled with the baseplate structure member, it is possible to stabilize the quality of the overall assembly of the shutter without requiring torque control as is experienced with conventional thread tightening.

In addition, in accordance with the above-described embodiment, the peripheral portions of the baseplate structure member are surrounded with the sector outer wall portion and controlling outer wall portion, and are covered with the lower plate and the blade receiving plate. After accommodating the shutter controlling members, the shutter blades and the like, it is possible to prevent oil from attaching to the shutter controlling members, the shutter blades and the like from the outside.

Furthermore, since various shafts mounted on the baseplate structure member are smoothly fitted with the bores of the lower plate 13a while being guided through sliding contact between the guide surface 13c of the lower structure member and the guide surface 1r of the baseplate structure member, the cases where the shafts displaced at assembly are fewer and their positions can be stabilized.

What is claimed is:
1. A focal plane shutter type camera comprising:
   a baseplate structure member comprised of a first chamber forming section having a baseplate with a shutter opening formed therein and adapted to accommodate shutter controlling members; and
   a lower plate structure member assembled to said baseplate structure member from the first chamber side and provided with a lower plate for partitioning said first and second chambers.
2. A focal plane shutter-type camera according to claim 1, wherein said shutter controlling members and said lower plate structure member are resiliently assembled to and coupled with said baseplate structure member.

* * * * *